Feb. 21, 1950  J. ROCK, JR  2,498,135
BOX COVER ASSEMBLY
Filed Jan. 2, 1947

INVENTOR.
Joseph Rock Jr.
BY Bodell + Thompson
Attys

Patented Feb. 21, 1950

2,498,135

UNITED STATES PATENT OFFICE 2,498,135

BOX COVER ASSEMBLY

Joseph Rock, Jr., North Syracuse, N. Y., assignor to Crouse-Hinds Company, Syracuse, N. Y., a corporation of New York Application January 2, 1947, Serial No. 719,781

1 Claim. (Cl. 220—3.8)

This invention relates to a box cover assembly including a cover plate for an opening in a box, a nut engaging the wall of the box and screw means operable externally of the cover plate to move the nut into engagement with the side wall of the box and detachably clamp the cover plate to the box. This type of cover assembly is used extensively on electrical conduit outlet boxes.

The invention has as an object a cover plate plate assembly of the type referred to embodying a particularly simple and economical structure by which the holder for the nut is securely attached to the under side of the cover plate, and the operating screw forms a water tight engagement with the cover plate.

The invention consists in the novel features and in the combinations and constructions hereinafter set forth and claimed.

In describing this invention, reference is had to the accompanying drawings in which like characters designate corresponding parts in all the views.

Figure 1:
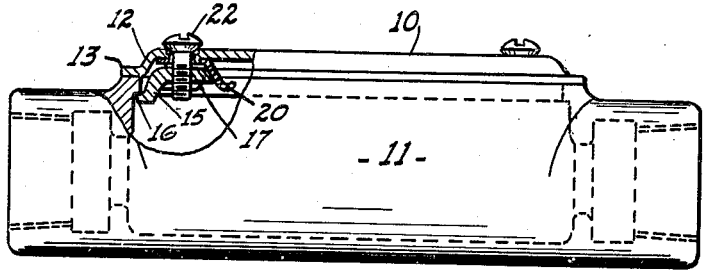
Figure 1 is a side elevational view, with parts broken away and parts in section, of a cover assembly embodying my invention applied to a conduit outlet box.
Figure 2:
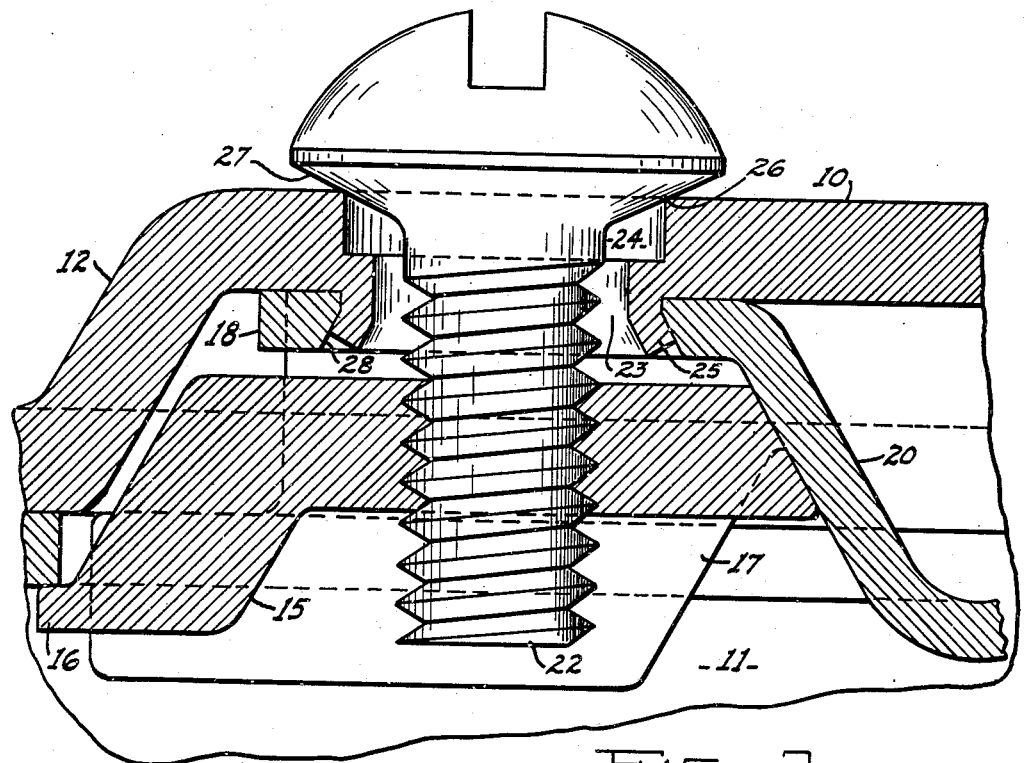
Figure 2 is an enlarged fragmentary sectional view illustrating the cover assembly structure.

The cover plate 10 is of form and dimension comparable to the opening in the side of the box 11. As here shown, the marginal portion of the cover is bent inwardly, as at 12, to form a marginal flange 13 seating upon the margin about the opening in the box. The cover is detachably clamped to the box by a nut 15, the forward end 16 of which engages the box. This engagement is brought about by a nut holder of general channel formation having depending spaced apart side walls 17, a bottom wall 18, and an inclined rear wall 20. The rear end of the nut engaging the wall 20 is formed with a complemental bevel whereby, when the nut is moved towards the cover plate 10 by operation of the screw 22, the nut is moved outwardly causing the forward end 16 thereof to engage the box, and the plate 10 is thus drawn tightly against the marginal surface about the opening in the box wall.

The cover plate 10 is formed with an aperture 23 to receive the screw 22, the aperture being considerably greater in diameter than the shank of the screw. The metal of the cover plate 10, contiguous to the aperture 23, is then forced axially inwardly to form a counterbore 24 in the outer portion of the aperture, and to form an annular extension 25 on the inner side of the cover plate. With this arrangement, the outer edge 26 of the counterbore 24 is sharp and arranged in a flat uniform plane with the top surface of the cover. The under side of the screw head is of conical formation, as indicated at 27. This enlarged counterbore permits universal movement of the screw in the aperture 23 during movement of the nut 15 into engagement with the box, and effects a water tight joint between the screw and the cover plate.

The bottom wall 18 of the nut holder is apertured to receive the extension 25, and the extension is expanded into engagement with the wall 18 of the nut holder. Preferably, the inner portion of the aperture in the nut holder is tapered, as at 28, and the expansion of the extension 25 thus causes the bottom wall 18 of the nut holder to be forced tightly and securely against the under side of the cover plate 10, avoiding the necessity of applying heat to the cover plate, or otherwise warping, or forcing, the same out of shape.

In most instances, it is desirable to secure the cover plate assembly to the box in water tight relation therewith. To this end, a gasket is inserted between the box and the flange 13 of the cover plate to effect a water tight joint but heretofore it has been extremely difficult to effect such a joint between the screw 22 and the cover plate. With the structure described, the conical portion 26 of the screw head engages the cover plate in such a manner that the joint between these members will withstand considerable pressure before leaking.

I do not make any claim per se to the feature of forming an extension on the under side of the cover to secure the nut holder thereto. Such an arrangement is disclosed in Patent No. 2,099,918, to D. Winter. The advantages obtained in my structure are brought about by forcing the metal, contiguous to the aperture, inwardly to form the enlarged counterbore with the edge 26 thereof engaging the screw head to make a water tight engagement with the cover plate.

What I claim is:

A box cover assembly comprising a cover plate formed with an aperture extending therethrough, the cover plate material, contiguous to said aperture, being forced axially inwardly to form a circular counterbore having a sharp edge in the upper portion of the aperture, and an annular extension on the inner side of the plate, a nut holder having an apertured wall positioned on said extension, said extension being expanded into engagement with the wall of the nut holder to secure the same to the under side of the cover, a fastening nut arranged in said nut holder, and a screw of less diameter than said aperture extending therethrough and threading into said nut, the under side of the head portion of said screw being of conical formation and engaging the outer edge of said counterbore.

JOSEPH ROCK, Jr.

REFERENCES CITED

The following references are of record in the file of this patent:

UNITED STATES PATENTS

| Number | Name | Date |
| --- | --- | --- |
| 297,242 | Emerson | Apr. 22, 1884 |
| 2,099,918 | Winter | Nov. 23, 1937 |
| 2,199,683 | White | May 7, 1940 |
| 2,226,819 | Jeffries | Dec. 31, 1940 |